Dec. 24, 1968    P. GALMICHE    3,417,460
METHODS OF BRAZING
Filed Feb. 23, 1966    4 Sheets-Sheet 1

INVENTOR
PHILIPPE GALMICHE
BY
Dayton R. Stemple, Jr.
ATTORNEY

Dec. 24, 1968   P. GALMICHE   3,417,460
METHODS OF BRAZING

Filed Feb. 23, 1966   4 Sheets-Sheet 2

LAYER OF CHROMIUM CARBIDE →

GRAPHITE →

← SUPPORT FOR POLISHING THE SAMPLE

— — —   — — —   A

— — —   — — —   B

← COPPER (SOLDER)
← CHROMIUM CARBIDE

← GRAPHITE

← GRAPHITE
← CHROMIUM CARBIDE SOLDER

← STAINLESS STEEL

← GRAPHITE

← CHROMIUM
CARBIDE
SOLDER

← TUNGSTEN

PYREX GLASS →

CHROMIUM
CARBIDE →
GRAPHITE →

United States Patent Office 3,417,460
Patented Dec. 24, 1968

3,417,460
METHODS OF BRAZING
Philippe Galmiche, Paris, France, assignor to Office National d'Etudes et de Recherches Aerospatiales (par abreviation: O.N.E.R.A.), Chatillon-sous-Bagneux, France, a body corporate of France
Continuation-in-part of application Ser. No. 828,604, July 21, 1959. This application Feb. 23, 1966, Ser. No. 529,465
3 Claims. (Cl. 29—473.1)

ABSTRACT OF THE DISCLOSURE

This invention is directed to improvements in methods of brazing in which a carbide layer is formed on a piece of carbon and in which the carbide coated piece is then joined in situ to a second piece through the use of a hard solder having a melting temperature higher than that required to form the carbide layer on the carbon piece. The carbiding and joining operations are carried out in an atmosphere of hydrogen, a hydrohalogenic acid and a corresponding halide of a selected metal.

This application is a continuation-in-part of my copending application Ser. No. 404,979, filed Oct. 19, 1964, now Patent No. 3,246,395, granted Apr. 19, 1966, for "Methods of Brazing Metallic Pieces Together," which application Ser. No. 404,979, filed as a continuation-in-part of prior application Ser. No. 828,604, filed on July 21, 1959, now abandoned, and matured into a continuation of said prior application Ser. No. 404,979.

THE INVENTION

The present invention relates to the coating of a carbon piece, i.e. a piece of a material of the group consisting of graphite, diamond and coke, with a layer of a carbide of a metal called "metal B," of the group consisting of chromium, titanium, tantalum, zirconium, niobium, hafnium, vanadium and thorium, and also to the joining of such a piece, immediately upon the formation of said coating thereon and by a mere increase of the temperature of the treatment container, with a piece juxtaposed to said first piece, with the interposition, between them, of a brazing solder, said second piece being made either of the same material as the first piece (i.e., of the group consisting of graphite, diamond and coke) or of a material selected from the group consisting of metals, alloys of metals, sintered mixtures of at least one metal and at least one refractory oxide, and metal carbides.

Prior to my invention, coatings of a metal carbide were formed on a carbon piece by heating said piece in a powder either of the metal in question (chromium, titanium, tantalum, zirconium, etc.), or of the oxide of this metal.

Both of these methods (heating in the metal powder and heating in the metal oxide powder) have the drawbacks inherent to methods where two bodies in the solid state are caused to react with each other. The surfaces of contact of the powder with the piece is never perfectly total whatever be the precautions that are taken. There are unavoidable lacunas. On the other hand, the recesses of a porous carbon piece stand no chance of receiving a deposit of metal carbide.

Furthermore, the temperatures at which such metal carbide coatings start being formed are well above the melting temperatures of usual solders. It is therefore impossible to perform during the same treatment both first the formation of the metal carbide layer on the surface of the carbon piece and, by raising the temperature, the brazing of this layer with another piece.

Considering now separately the two above mentioned known methods, it is found that the heating of a carbon piece in a metal powder to form a metal carbide layer on said piece requires temperatures exceeding 1250° C., at which the powder is sintered and forms crusts on the piece. These crusts must be removed, and correspond to losses of the metal, and this removal is a delicate operation, involving risks of injury of the metal carbide layer.

In the methods where the carbon piece is treated in a powder of an oxide of the metal the carbide of which is to be formed, the above mentioned drawback is reduced because a metal oxide is generally more refractory than the corresponding metal. But, in this case, a portion of the surface of the piece forms carbon oxide and is eliminated, thus deteriorating the surface of said piece, which is fitted.

The object of the present invention is to obviate these drawbacks.

For this purpose, according to this invention the treatment is performed in a container wherein there is a deoxidizing atmosphere of hydrogen, a hydrohalogenic acid and a corresponding little volatile metal halide, the temperature and pressure conditions in said container corresponding to balanced concentrations of the vapors present therein. Among the little volatile metal halides which are suitable, I may cite the halides of chromium, nickel, cobalt, and iron, either single or in admixture, the metal of such a halide being hereinafter called "metal A." An atmosphere consisting of hydrogen, a hydrohalogenic acid and a corresponding metal A halide has as an extremely strong deoxidizing power, much stronger than that of the so-called reducing atmospheres used up to now.

As for the metal B which is to form the metal carbide layer on the surface of the piece to be treated (said metal B being at least one of the metals of the group consisting of chromium, titanium, tantalum, zirconium, niobium, hafnium, vanadium and thorium), it is placed in close proximity to the piece of graphite, diamond and coke, the term "close proximity to" including "contact with."

The above mentioned atmosphere may be obtained in a simple manner by heating, in a hydrogen containing medium, a partly fluidtight container or box (that is to say a box permitting limited gaseous interchanges between the inside thereof and the hydrogen medium on the outside thereof) at the bottom of which box has been placed a so-called "reactive mixture" consisting, on the one hand, of a small amount of a halide capable of being dissociated by heat, generally an ammonium halide, and, on the other hand, of at least one of the above mentioned metals A, to wit chromium, nickel, cobalt and iron, in the divided form. The pieces to be treated are located in said box.

At the beginning of heating, ammonium halide dissociates, forming a gaseous mixture of hydrogen, hydrohalogenic acid and nitrogen, which drives out from the partly fluidtight box the air initially present therein, whereas a portion of this hydrohalogenic acid forms, with the metal A in the divided form, a little volatile halide to restore the concentration of hydrohalogenic acid to the value corresponding to equilibrium between the gaseous bodies in presence.

I may also make use, as reactive mixture, of a mixture of a metal A halide and of ammonium halide, the latter serving to drive out the air initially present in the treatment box.

Above a temperature of about 700° C., the atmosphere in the treatment box simultaneously contains according to the conditions of a balanced reaction, hydrogen, hydrohalogenic acid and the corresponding metal A halide, and when the proportions of said bodies in the atmosphere are modified by any circumstance, they are automatically restored, for a given temperature and a given pressure at which the operation is conducted (the pressure being generally, but not necessarily, little different from atmospheric pressure).

Thus, if a small amount of hydrogen enters the treatment box, owning to the partial fluidtightness thereof, the amount of metal A halide just necessary for restoring the balanced composition of the atmosphere in the box is automatically formed.

Likewise, if the relative proportion of hydrogen and hydrohalogenic acid in this atmosphere undergoes a modification due, for instance, to the reduction, under their combined actions, of a metallic oxide present on the pieces to be treated with formation of water vapor and of vapor of the halide of the metal of the oxide, the balanced composition is automatically restored.

According to an embodiment of the present invention a certain amount of metal B is placed in close proximity to the piece to be treated and the whole of the treatment box, containing said piece, is heated to a temperature above 700° C. and preferably above 800° C.

The hydrohalogenic acid vapors of the atmosphere react with metal B to form vapors of the corresponding metal B halide. This metal B halide vapors react locally with the surface of the graphite piece to form metal B carbide on said surface whereas hydrohalogenic acid forms with the hydrogen of the atmosphere. The concentration of hydrohalogenic acid then exceeds that corresponding to equilibrium. But, since there is an amount of metal B in close proximity, the excess of hydrohalogenic acid reacts with said metal B to form vapors of metal B halide which react with the graphite of the piece to form a further amount of metal B carbide, and so on.

Preferred embodiments of the invention will be hereinafter described with reference to the appended drawings, given merely by way of example, and in which.

Figure 1:
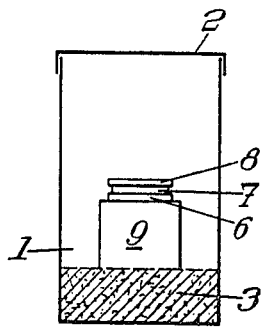
FIGS. 1 to 3 and 3a illustrate examples of the brazing method according to this invention.

The phenomenon upon which the present invention is based was discovered when assembling together, by brazing, by means of a copper or silver-copper solder, elements of 18/8 chromium nickel steel to form a honeycombed structure.

The atmosphere for this brazing operation consisted essentially of hydrogen, hydrofluoric acid and chromium fluoride. The mixture comprised ammonium fluoride and chromium powder.

The treatment was performed at 1150° C. and resulted in the production of very satisfactory assemblies.

But the discovery made in this experiment was the following one.

The steel elements to be brazed together had been carried by graphite supports.

Now, in the conditions above described, these graphite supports were superficially chromized, i.e., a layer of chromium carbide was formed thereon.

Not only did I discover the surprising fact that a layer of chromium carbide can be formed in this way on graphite pieces, even when there is no substantial addition of chromium on the metal elements supported by said graphite pieces, but also I found that this layer of chromium carbide is perfectly wetted by the excess of solder dipping from the metal pieces to be brazed together. The experiments I made after this discovery showed that, according to the present invention, it is possible to form, in a reproducible manner, layers of chromium carbide intimately bound to the underlying graphite (or diamond, or coke) piece and that it is possible to form such layers by means of hydrogen, hydrohalogenic acid and corresponding chromium halide atmosphere in the box.

The treatment which permits of obtaining a layer of chromium carbide on a piece of graphite is, for instance, as follows:

*Example I*

The graphite piece is heated in a mixture having, for instance, the following composition:

| | Percent |
|---|---|
| Magnesothermic chromium in the form of grains | 60 |
| Alumina or magnesia acting as a diluting substance | 40 |

A small amount for instance of about 1% of ammonium chloride, bromide or iodide (or of halogen compounds such as IBr, ICl₃, if it is desired to avoid the presence of chromium nitrides in the chromized layers) is added.

The whole is placed in a steel box provided with a partly fluidtight lid, which is heated, at a temperature of at least about 800° C., in an oven containing a protective atmosphere, such as hydrogen, argon or ammonia, then cooled down on the outside of said oven.

After treatment, the graphite piece is separated from the reactive mixture.

The treatment may also be carried out by heating the pieces in chromium in the form of grains in the presence of small amounts of ammonium fluoride or chromium fluoride. An inert refractory diluting substance may be added to avoid a parasitic diffusion of carbon into chromium, which diffusion may take place when the treatment is performed at temperatures above 950° C.

As it will be hereinafter described, the chromizing of graphite articles may be included in a treatment such as the brazing of said articles or the coating thereof with molten metallic deposits.

Figure 4:
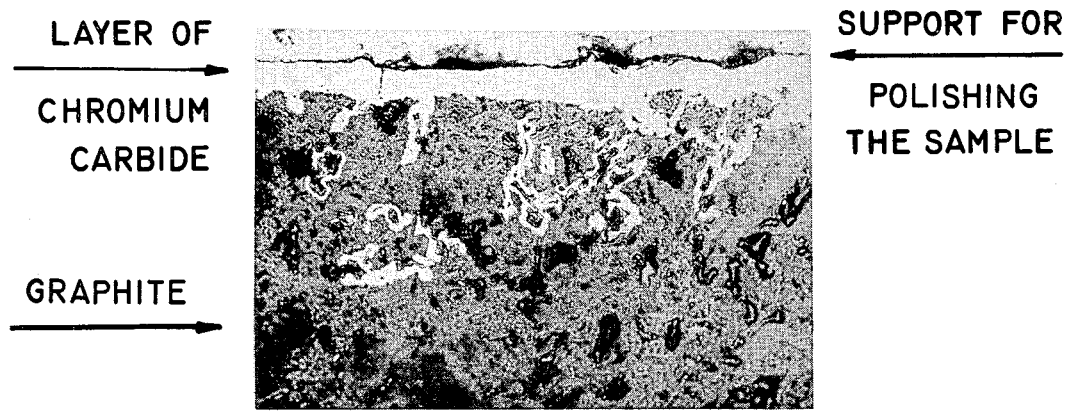
FIG. 4 is a microphotography of a piece of graphite with a chromized layer of chromium carbide anchored thereon.

FIG. 4 is a microphotography showing with a magnification of 500 the cross section of a graphite piece provided with a superficial lining consisting of a chromium carbide layer.

The graphite piece is visible in dark and the chromium carbide layer formed thereon in white. The chromium carbide layer is anchored to the graphite piece by projections of said carbide into the recesses between the graphite crystals. Some of these recesses are shown as connected with the chromium carbide layer, other seem to be unconnected therewith but the connections exist, being not visible because they are not intersected by the cross section plane.

Graphite or analogous carbon grains may be treated according to the invention so as to obtain a dynamically free powder of grains the surface of which consists of chromium carbide. This operation may be effected by heating, in partly fluidtight boxes placed in a protective atmosphere, an intimate mixture comprising the graphite powder, chromium in a very fine form supplied in dosed amounts, a soluble refractory diluting substance, such as magnesia, and an ammonium halide.

*Example II*

The mixture comprises:

Graphite in the form of flakes or grains: 50% by weight;
A magnesothermic half-product (chromium+magnesia): 50% by weight, containing 30% of chromium.

About 1% of an ammonium halide, for instance ammonium bromide is added.

The whole, in the form of an intimate mixture, is placed in a partly fluidtight steel box, having chromized inner walls, which is heated for two hours at 925° C., said box being surrounded by a hydrogen atmosphere.

After this treatment, I eliminate, in any suitable manner and for instance by sifting, magnesia and the chromium halide and also the amount of chromium that may have remained. If the halide consists of bromide, iodide or chloride, this elimination treatment can be performed by washing the flakes in hydrochloric acid diluted in water, and drying.

The treatment may be applied in the same conditions to graphite fibers or graphite clothes, or to diamond grains preliminary to the use of the grains thus treated to the brazing thereof on a metallic support.

The most direct application of the invention seems to be the protection of graphite pieces against oxidation, chromium carbide layers resisting to oxidation up to temperatures above 1000° C. But the protective layers thus formed are very thin and liable to be scratched through, and any scratch leads to a quick destruction of the piece subjected to oxidizing at high temperature as this piece is hollowed out so that only the chromium carbide layer remains.

On the contrary, chromium carbide layers formed on graphite have a particular interest due to their aptitude to being wetted by molten metals, which permits brazing with other pieces or coating with a metal.

According to my invention, a graphite piece may be coated with a metal, hereinafter called "metal C" and such as silver, copper, gold, a silver and copper alloy, a silver and palladium alloy, a gold and copper alloy, owing to the formation of a metal B carbide lining on said graphite piece (either locally or over the whole surface thereof), which metal B carbide is wetted by the molten metal C.

In the areas which are not lined with the metal B carbide, the molten metal C does not wet the pieces and therefore either takes the form of droplets or flows down.

The formation of the metal B carbide lining on the surface of a graphite piece and the melting of metal C may be performed in an atmosphere of hydrogen, hydrohalogenic acid and the corresponding halide of metal B by preliminarily forming a thin deposit of metal B (for instance electrolytic chromium) on the metal C (thickness of the electrolytic chromium deposit equal to some microns).

In this case (supposing that the metal B is chromium) and in particular when leaving the temperature of treatment constant for some time at a value within the range extending from 800° C. to 900° C., the chromium initially deposited on metal C deposits along the areas of the graphite piece, positioned in close proximity thereto, by being conveyed through vapors of the chromium halide. At the melting temperature of metal C, the latter then wets perfectly well the areas that have been thus lined with chromium carbide.

It is possible to melt, in an atmosphere as above mentioned, copper plates having a deposit of chromium formed thereon on graphite plates, or to melt copper pellets having a deposit of chromium formed thereon in cups formed in graphite articles.

The graphite thus metallized may be subsequently soldered to different metallic materials in the usual conditions (for instance tin soldering of copper current inputs on graphite dynamo brushes locally covered with copper).

Figure 5:
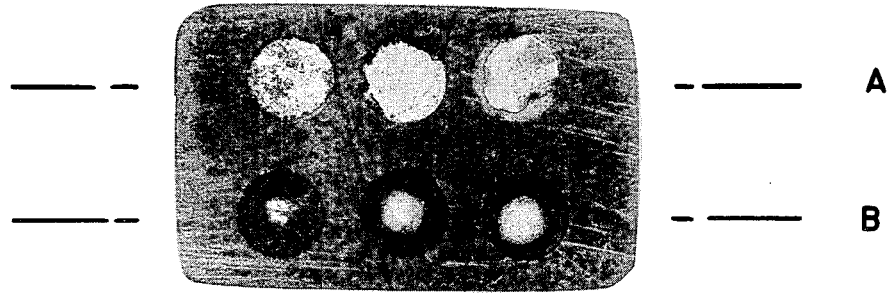
FIG. 5 is a microphotography illustrating the respective behaviours of different hard solders in cups formed in a piece of graphite.

FIG. 5 illustrates an experiment relative to the anchoring of different metals (brazing solders) on a piece of graphite.

This piece of graphite is in the form of a plate provided with two rows of recesses forming as many cups.

The bottom of FIG. 5 shows what happens when the whole is heated to a temperature such that the hard solder metal is molten directly in the cups. Said solder metal forms drops in the cups and does not wet the surface thereof.

On the contrary, if, as was the case with the upper row of cups of FIG. 5, the lumps of solder metal were preliminarily chromium plated and if the whole is heated in an atmosphere containing hydrogen and vapors of hydrohalogenic acid, this acid forms, with the chromium present on the surface of the metal lumps, chromium halide vapors which decompose on the surface of the graphite plate to form a chromium carbide layer which wets the graphite plate and on which the hard solder metal is adhered when molten. This hard solder metal is thus spread on, and strongly adhered to, the surface of the cups formed in the graphite plate through the intermediate of the chromium carbide layer.

Of course the metal which constitutes the hard solder must have a melting point higher than about 800° C., which is the temperature at which the layer of chromium carbide is formed.

Figure 6:
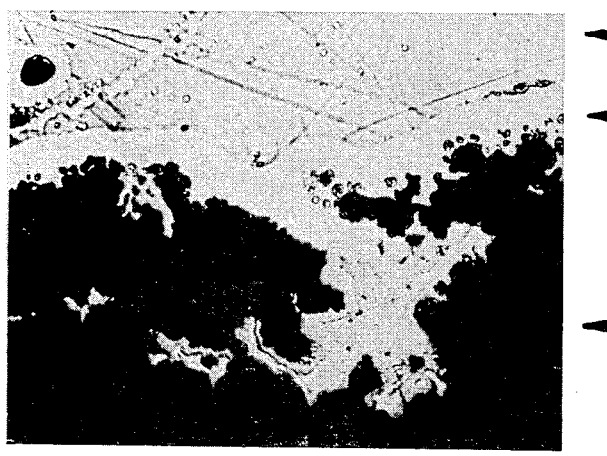
FIG. 6 is a microphotography illustrating how a copper hard solder is secured to a layer of chromium carbide itself anchored to a piece of graphite.

FIG. 6 shows the structure of the joining zone in the case of a chromized graphite piece coated with copper fixed thereon by melting. It may be seen on the one hand that there is no solution of continuity in the brazed zone and on the other hand that there is a local penetration, into the porosities of graphite, of chromium carbide and of the molten metal coating.

The magnification in this case is 1000.

I will now deal with the brazing, in an atmosphere as above stated, of a carbon piece (meaning a graphite, diamond or coke piece) with either a carbon piece (the term carbon including also the same materials) or a piece of a material selected from the group consisting of metals, alloys of metals, sintered mixtures of at least one metal and at least one refractory alloy, and metal carbides.

If the carbon piece is already coated with a layer of metal carbide the method to be applied is that recited in claim 5 of my parent patent application Ser. No. 828,604, filed July 21, 1959, for Method of Treating Refractory Metallic Pieces.

But if the carbon pieces has an uncoated surface, according to the present invention, I may perform in the same treatment a first step consisting in the formation, at a suitable temperature, of a layer of metallic carbide on the carbon piece and a second step consisting in the brazing, at a higher temperature, of the two pieces (that of carbon now coated on its surface with the metallic carbide layer and the other piece).

In particular it is possible to make sandwich materials of graphite and molybdenum, graphite and chromized tungsten, or graphite and chromized molybdenum comprising the desired number of superposed sheets, by performing the brazing of these materials together through the metal B carbide layer formed on the surface of the graphite elements, in the hydrogen and hydrohalogenic acid atmospheres above referred to, this in the course of a same treatment.

Figure 7:
FIG. 7 is a microphotography illustrating the brazing of a piece of stainless steel on a layer of chromium carbide itself anchored on a piece of graphite.

FIG. 7 shows the structure of the joining zone in the case of a piece of stainless steel poined to a piece of graphite through a layer of chromium carbide, the hard solder consisting of a silver-palladium alloy. The magnification is 500.

Figure 8:
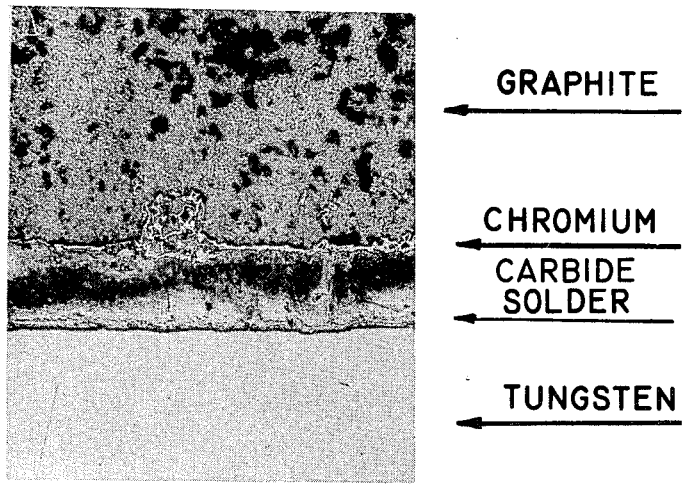
FIG. 8 is a similar view but in which stainless steel is replaced by tungsten.

FIG. 8 is a similar view in the case where the metal is tungsten and the hard solder is copper. The magnification is 150.

It will be noted that the thickness of the chromium carbide layer is smaller in the case of FIG. 8.

The coating of graphite articles to form thereon a continuous layer of substantial thickness of a metal having a high melting point can also be obtained by electrolytically forming a composite structure consisting of superposed deposits of said high melting point metal, of a metal fusible at the temperature of treatment and of a complementary metal compatible with said first metal, after which the face of the composite structure thus obtained, formed of the metal of lower melting point, is brazed on the graphite article through the metal B carbide layer formed thereon.

In different manner I may also coat, either locally or on the whole surface thereof, the graphite piece lined with a layer of metal B carbide with an envelope of a metal having a high melting point, such as nickel, by first effecting a thin deposit of a metal such as copper, gold, silver or the like, then a deposit of the metal having a higher melting point (nickel), the whole being then placed in an oven, in a hydrohalogenic acid and hydrogen atmosphere, and heated to a temperature higher than the melting point of the metal of lower melting point (copper) which acts as a hard solder.

Graphite surfaces lined with a metal B carbide layer have a special aptitude to being enamelled directly, that is to say without an intermediate support.

Figure 9:
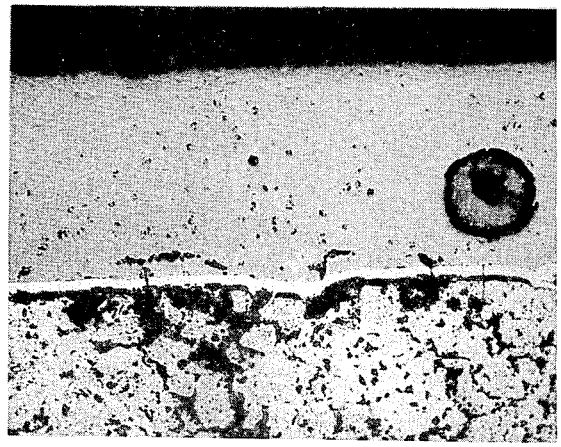
FIG. 9 is a microphotography illustrating the anchoring of a piece of glass on a layer of chromium carbide itself anchored on a piece of graphite.

FIG. 9 shows, with a magnification equal to 150, the structure of the binding zone in the case of a chromized graphite piece coated, by melting with, Pyrex glass.

To sum up, carbon under its various allotropic forms, i.e. graphite, diamond or coke, subjected to the action of a metal B halide vapors is coated with perfectly adhesive thin layers consisting chiefly of chromium carbide. The superficial layers of chromium carbide may be formed in an operation which precedes brazing but they are preferably formed during the brazing treatment. It suffices in this case either of utilizing solders coated with a thin deposit of metal B, for instance electrolytic chromium, or of utilizing solders contain metal B. During the treatment in an atmosphere of hydrogen and hydrohalogenic acid, the metal B fluoride of the solder is conveyed in gaseous phase to the adjoining areas of the piece the main body of which consists of carbon, thus giving said piece the aptitude to brazing in the above mentioned atmosphere.

Being given a piece of graphite (and what is said of graphite also applies to diamond and coke), the chief object of the present invention is to form on the surface of said piece a layer of a metal B carbide. Another object of the invention is to perform, in a single treatment and by the mere increase of the temperature of the treatment container the formation of such a layer and its joining, by means of a solder, with another piece made of a material of the group consisting of graphite lined with a metal B carbide, metals, alloys of metals, sintered mixtures of at least one metal and at least one refractory oxide, and metal oxides.

The formation, on a graphite piece, of a superficial layer of metal B carbide is, according to the present invention, performed in an atmosphere containing hydrogen, a small amount of hydrohalogenic acid and a corresponding little volatile metal A halide, this atmosphere being in the balanced state under the pressure and temperature conditions of said atmosphere.

The operation is generally performed as follows:

To obtain the desired atmosphere, I make use of at least one partly fluidtight container 1 (i.e., a container the lid 2 of which is adjusted to permit limited gaseous interchanges between the inside and the outside thereof), as shown by FIG. 1.

I place in container 1 the piece or pieces to be treated, with a small amount of metal B in close proximity (this term including direct contact) to the surface of a graphite piece.

I dispose container 1 in a medium of hydrogen or cracked ammonia.

The whole is heated at a temperature of at least 700° C.

In these conditions, the hydrohalogenic acid vapors in the balanced atmosphere of container 1 forms with metal B a halide of this metal which reacts with the graphite of the piece to form a carbide of metal B.

The halogen released by this reaction reacts with the hydrogen of the container atmosphere to restore the hydrohalogenic acid at the concentration corresponding to the balanced state of said atmosphere.

In container 1, it is necessary further to provide means for maintaining the balanced state of the atmosphere in said container, and in particular for restoring the proper proportion of hydrohalogenic acid in case of this proportion varying for some reason. For this purpose, there is placed, in said container 1, at a substantial distance from the graphite piece, a so-called "reactive mixture" 3 consisting of a reserve of a metal A and of a halide of this metal A or of a halide, such as an ammonia halide, capable of being dissociated by heat to form, with said metal A, the desired metal A halide. This metal A halide is decomposed to restore the required amount of hydrohalogenic acid.

It is known that neither nickel carbide nor cobalt carbide exist. On the other hand, the heat of formation of iron carbide is too low to permit, in the conditions of treatment, carbon (i.e., graphite, or diamond or coke) to react with the iron halides to form iron carbide. Only chromium halides (chromium being then considered as a metal of group A) are capable of reacting with the carbon of the piece to form chromium carbide on the surface of said piece. This is why chromium belongs also to group B. The question may then be raised of knowing why there is formed on the piece a layer of a carbide of a metal B (other than chromium) when the atmosphere contains a chromium halide. The answer is that this is due to the fact that the respective distances from chromium and the metal B to the graphite piece are very different. Metal B is in close proximity to the graphite piece whereas chromium is at a substantial distance therefrom. Consequently the metal B carbide is formed in considerable amount as compared with the chromium carbide, only an insignificant amount of which is formed.

It should be noted that, in a similar manner, when chromium carbide is to be formed on the surface of the carbon piece, even when the treatment atmosphere containing a chromium halide, some amount of chromium must be placed in close proximity to said piece.

*Example III*

On a graphite plate 6 (FIG. 1) it is desired to braze a structure 8 enveloped in a perfectly continuous manner in a molybdenum coating. Between graphite plate 6 and molybdenum enveloped structure 8, I place a sheet of copper or gold solder 7, chromium plated on the face thereof in contact with graphite plate 6 (thickness of the chromium deposit equal to 10 microns). Therefore, in this case, the solder is copper or gold and metal B is chromium. The pieces are carried by a steel support 9 placed in container 1 located in a hydrogen containing medium and containing, at a distance from elements 6, 7, 8, a reactive mixture 3 consisting of chromium powder (metal A, in this case the same as metal B) and acid ammonium fluoride ($F_2NH_5$), and the whole is heated at a temperature higher by 30° C. than the melting temperature of the solder that is used. During the heating up, the layer of chromium carbide is first formed and then, the solder is molten.

The assemblies obtained after the brazing treatment are continuous along the brazed areas. Metallographic examination of a section permits of seeing the thin film of chromium carbide diffused on the surface of the graphite plates, this carbide film having ensured a perfect wetting during the treatment.

*Example IV*

This example relates to the brazing of two graphite plates together.

In this case, structure 8 of the preceding example is replaced by a graphite plate 6'. The solder (copper or gold) and metal B are the same, and similarly disposed, as in the preceding example, but the solder sheets are chromium plated on both of their faces so as to permit the formation of a chromium carbide film on the surface of each of the two graphite pieces. In order to avoid chromizing, undesired in this case, of the graphite plates along areas other than the surfaces which are to be joined together by brazing, the reactive mixture placed in the treatment container at a distance from the graphite pieces consists of cobalt powder (metal A) and ammonium fluoride. In this case, the atmosphere in the treatment container 1 at high temperature is a mixture of hydrofluoric acid and hydrogen in the state of equilibrium of reduction of the cobalt fluoride for the temperature of treatment that is applied.

Example V

Figure 2:
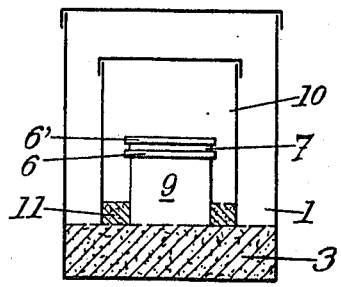

Two graphite plates 6 and 6' are to be brazed together (FIG. 2).

The solder consists of copper or gold.

This solder 7 is in the form of sheets, chromium plated on both faces thereof.

The assembly formed by the two graphite plates 6 and 6', to be brazed together, tightly held with the interposition between them of solder sheet 7 chromium plated on both of the faces thereof, is placed in a partly fluidtight auxiliary box 10 itself placed in a partly fluidtight main box 1 located in a hydrogen containing medium.

At the bottom of this main box 1 there is provided a reactive mixture 3 consisting of acid ammonium fluoride ($F_2NH_5$) and chromium.

At the bottom of the auxiliary box 10 there is provided a certain amount 11 of ammonium fluoride ($F_2NH_5$).

The whole is heated at a temperature higher by 30° C. than the melting temperature of the solder.

The areas assembled together by brazing according to this treatment have no solution of continuity and no porosity.

Metallographic examination of cross sections of the areas thus assembled by brazing shows the presence of a thin film of chromium carbide.

Example VI

This example relates to the brazing of small diamond grains on a disc of stainless steel.

Of course, I may use diamond grains that have been already provided with a chromium carbide layer by a method similar to that above described in Example II (by heating the diamond grains in a reactive mixture containing very fine chromium powder, a refractory diluting substance and a halogen containing conveyor, such as ammonium fluoride, for one hour at 875° C.) and braze these chromium carbide coated grains on the stainless steel disc in the manner disclosed in my prior U.S. patent application Ser. No. 828,604, filed July 21, 1959, for "Method of Treating Refraction Metallic Pieces."

But, according to the present invention, the two steps, consisting in the formation of a chromium carbide layer on the diamond grains and the brazing of said grains on the stainless steel disc, may be performed in the same container.

Figure 1A:
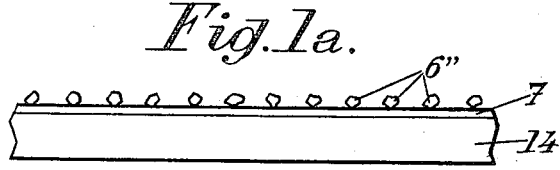

For this purpose, in a container 1, 2, the bottom of which contains a reactive mixture 3, as shown by FIG. 1, I place, on a steel support 9, an assembly, as shown by FIG. 1a; including stainless steel disc 14, a sheet of solder 7, copper for instance, and diamond grains 6'', copper sheet 7 being electrolytically chromium plated on the upper face thereof, which carries the diamond grains.

During the first step of heating, at about 925° C., the areas of the diamond grains resting on the chromium plated face of copper sheet 14 are coated with a layer of chromium carbide. Then, as the temperature is increased and exceeds the melting point of the brazing solder, this chromium carbide layer is brazed to stainless steel disc 14.

Example VII

This example relates to the brazing of copper electric terminals on a graphite dynamo element.

This element is provided with blind holes of a diameter equal to 6 mm., corresponding to the dynamo current outputs.

Copper pellets, of 5 mm. diameter and 1 mm. thickness are to be molten in said holes, said pellets being coated, on the surface thereof that is to be in contact with the graphite wall, with a 10 microns thick electrolytic chromium deposit.

The graphite piece containing such a copper pellet in each blind hole is placed in a partly fluidtight auxiliary nickel container containing no chromium and such as the container 10 of FIG. 2.

This auxiliary box is subjected to a heat treatment in a box containing a non-chromizing deoxidizing atmosphere of hydrogen and a hydrohalogenic acid.

The treatment is intended to ensure a perfect wetting on the molten copper over the areas located in the vicinity of the chromium plated copper pellets while avoiding a general chromizing of the areas, which chromizing might lead to an increase of the wear and tear of the dynamo brushes.

After treatment, performed at 1120° C., the blind holes of the dynamo brushes are coated with a copper deposit which is perfectly adhesive owing to the provision of the chromium carbide film localized in the brazing area. The remainder of the surfaces of the dynamo brushes has a semibright black superficial appearance and is not chromized at all.

Current output conduits of copper may be subsequently brazed on the copper coated areas through the usual methods of brazing in an ordinary atmosphere. When tests for conductors thus brazed are performed, breaking never takes place in the brazed areas but in the subjacent graphite layers.

Example VIII

It relates to the brazing of thermoelectric couples lined with a stainless steel envelope in recessed formed in graphite bars.

It is desired to braze in a continuous manner a great number of thermoelectric couples in small recesses provided in graphite bars. The thermoelectric couples are wires coated in a flexible stainless steel envelope from which they are insulated by magnesia so that the problem to be solved corresponds to that of brazing on graphite bars small tubes made of a chromium alloy.

On the bottom of each of the notches in which a thermoelectric couple is to be brazed I place a small pellet of gold chromium plated over the area which is to be brazed on the graphite area (the pellets have been obtained by cutting from a gold sheet chromium plated on one side thereof, the thickness of the chromium deposite being 10 microns).

The brazing treatment is then performed for half an hour at 1080° C. in a nonchromatizing hydrogen and hydrohalogenic acid deoxidizing atmosphere under balanced reaction conditions (presence in the treatment boxes, heated in a hydrogen atmosphere, of a mixture of nickel powder and ammonium fluoride and chloride at the rate of 3 g. per liter). After the brazing treatment, the sheaths of the thermocouples are intimately secured to the graphite surfaces through the molten solder, which has prefectly wetted the graphite surfaces which are chromized only in the vicinity of the chromium plated solder pellets.

Figure 3:
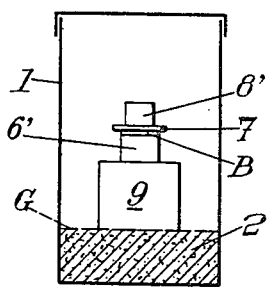

Example IX (FIG. 3)

This example relates to the brazing of a piece of tantalum carbide on a graphite base.

At the lower end of a container 1 made of soft steel and of a volume of 250 cm.³, I dispose a reactive mixture 2 consisting of 1 g. of acid ammonium fluoride and 5 g. of chromium in the state of powder. This mixture is covered by a nickel grid G.

I place, upon steel support 9 resting on said grid G the graphite piece 6 on the upper face of which has been placed a small amount of tantalum powder B. Above this powder is placed a sheet of copper 7 acting as solder. Finally, on the top of the whole, I dispose the piece 8' of tantalum carbide. Then container 1 is closed.

The container thus prepared is placed in a bell-shaped oven through which is flowing a slow stream of hydrogen. During the heating up period, before the melting of the solder, the tantalum powder forms, through a gaseous phase of tantalum fluoride, a layer of tantalum carbide on the surface of the graphite piece. Then, when the temperature rises up to 1100° C., brazing takes place, this temperature of 1100° C. being maintained for about 15 minutes. After this treatment the container is allowed to cool down on the outside of the oven in a protecting hydrogen atmosphere.

The wetting by the solder shows no discontinuity and the mechanical resistance of the brazed portion is higher than that of the two pieces joined together.

*Example X*

This example relates to the brazing of a stainless steel tube in a graphite piece.

Figure 3A:
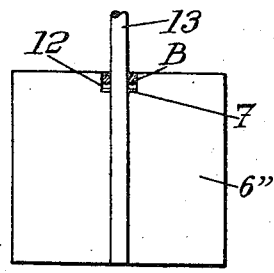

FIG. 3a shows the parts to be assembled together. These parts are placed in a container 1 provided at the bottom with a reactive mixture 2 as shown by FIG. 3. The mixture is covered by a grid G carrying a steel support 9.

On said support is mounted a graphite piece 6″ (FIG. 3a) provided, at the top, with a groove 12 machined therein. In this groove is engaged a tube 13 of 18/8 stainless steel.

This tube 13 is to be brazed in position by means of a silver-palladium solder 7. A small amount of titanium powder B is placed on the bottom of groove 12.

The whole is heated in the container in the same manner as above stated concerning Example IX.

During the heating up period, before melting of the solder the titanium powder B in groove 12 is conveyed, in the form of gaseous titanium fluoride upon the adjacent portions of graphite piece 6″ to form thereon a superficial layer of titanium carbide. Then, the temperature increasing, the solder melts and wets perfectly well both stainless steel and the layer of titanium carbide. The brazing thus obtained constitutes, between the graphite piece and the stainless steel tube, a perfectly fluidtight and strong brazing.

*Example XI*

This example relates to the brazing of two graphite pieces together.

The operation is performed in the same conditions, as above described for Example IX with the difference that the tantalum carbide piece 8′ is replaced by the second graphite piece.

What I claim is:

1. In a method for forming a layer of a carbide on a piece of carbon and joining the carbide coated carbon to a second piece the steps of, disposing an amount of at least one of a first metal of the group consisting of chromium, titanium, tantalum, zirconium, niobium, hafnium, vanadium and thorium in close proximity to a piece of carbon of the group consisting of diamond, graphite and coke, and an amount of a second metal of the group consisting of chromium, nickel, cobalt and iron at a substantial distance from said piece of carbon, and heating the whole in an atmosphere consisting essentially of hydrogen, a hydrohalogenic acid and a corresfonding halide of the second metal under conditions corresponding to a balanced reaction of the halide by hydrogen, the temperature of heating being higher than 700° C. whereby there is formed on the surface of said piece of carbon a layer of the carbide of said first metal.

2. The method of claim 1 additionally including the steps of, prior to any heating, placing into juxtaposition with said carbon piece a second piece having its surface made of a material of the group consisting of metals, alloys of metals, sintered mixtures of at least one metal and at least one refractory oxide, metal carbides, diamond, graphite and coke, interposing between said pieces a hard solder capable, in the fused state, of joining together said second piece with a metal carbide, then, after said carbide layer has been formed on said carbon piece, further heating the whole to a temperature higher than the melting point of said solder so that said carbon piece is joined to said second piece through said carbide layer by means of said solder.

3. The method of claim 2 in which both of said pieces are made of a material of the group consisting of diamond, graphite and coke, and an amount of said first metal is interposed between said solder and each of said pieces.

References Cited

UNITED STATES PATENTS

| | | | |
|---|---|---|---|
| 2,561,565 | 7/1951 | Edson | 29—494 |
| 2,561,566 | 7/1951 | Edson | 29—494 |
| 2,801,187 | 7/1957 | Galmiche | 117—50 |
| 2,875,090 | 2/1959 | Galmiche | 29—494 |
| 3,019,137 | 1/1962 | Hanlet | 117—228 X |
| 3,119,171 | 1/1964 | Anderson | 29—472.7 |
| 3,230,110 | 1/1966 | Smith | 117—228 |
| 3,253,942 | 5/1966 | Bungardt et al. | 117—50 |

CHARLIE T. MOON, *Primary Examiner.*

J. T. CLINE, *Assistant Examiner.*

U.S. Cl. X.R.

29—494; 117—50, 228